US012615469B2

(12) United States Patent
Girardier et al.

(10) Patent No.: US 12,615,469 B2
(45) Date of Patent: Apr. 28, 2026

(54) SWITCHING BETWEEN MULTIPLE EARBUD ARCHITECTURES

(71) Applicant: Google LLC, Mountain View, CA (US)

(72) Inventors: Thomas Girardier, Poisy (FR); Florian Denis, Vincennes (FR)

(73) Assignee: GOOGLE LLC, Mountain View, CA (US)

( * ) Notice: Subject to any disclaimer, the term of this patent is extended or adjusted under 35 U.S.C. 154(b) by 71 days.

(21) Appl. No.: 17/798,963

(22) PCT Filed: Feb. 11, 2021

(86) PCT No.: PCT/IB2021/000057
§ 371 (c)(1),
(2) Date: Aug. 11, 2022

(87) PCT Pub. No.: WO2021/161096
PCT Pub. Date: Aug. 19, 2021

(65) Prior Publication Data
US 2023/0069230 A1 Mar. 2, 2023

Related U.S. Application Data

(60) Provisional application No. 62/975,630, filed on Feb. 12, 2020.

(51) Int. Cl.
H04R 1/10 (2006.01)
H04R 7/00 (2006.01)
(Continued)

(52) U.S. Cl.
CPC ........... H04R 1/1041 (2013.01); H04S 7/304 (2013.01); H04W 76/15 (2018.02); H04R 2420/07 (2013.01)

(58) Field of Classification Search
CPC . H04R 1/1041; H04R 2420/07; H04W 76/15; H04S 7/304
(Continued)

(56) References Cited

U.S. PATENT DOCUMENTS

2003/0223604 A1 12/2003 Nakagawa
2009/0154739 A1* 6/2009 Zellner .................... H04R 3/00
                                                                          381/311
(Continued)

FOREIGN PATENT DOCUMENTS

CN            109314738         2/2019
WO     WO 2018/064053          4/2018
WO            2021/161096 A1    8/2021

OTHER PUBLICATIONS

International Search Report and Written Opinion of PCT/IB2021/000057 mailed Jun. 14, 2021, 9 pages.
(Continued)

*Primary Examiner* — Douglas J Suthers
(74) *Attorney, Agent, or Firm* — DORITY & MANNING P.A.

(57) ABSTRACT

In the present disclosure a method is proposed for switching from a first Bluetooth audio source to a second Bluetooth audio source in a user experience friendly manner, e.g. reducing latency. The method is performed by an audio rendering system comprising a primary wireless speaker and a secondary wireless speaker. The audio rendering system receives a first audio stream from the first audio source by using a first audio topology comprising a first set of wireless links. Upon receiving a request to switch to a second audio stream using a second audio topology, a second set of wireless links is established; and, the reception of the second audio stream starts while maintaining the audio rendering system and the first audio source connected by a wireless link of the first set of wireless links. The wireless speaker(s)
(Continued)

can be a wireless earbud, a bookshelf speaker, a floor speaker, an outdoor speaker, a subwoofer, a headset speaker.

13 Claims, 5 Drawing Sheets

(51) Int. Cl.
*H04S 7/00* (2006.01)
*H04W 76/15* (2018.01)
(58) Field of Classification Search
USPC ........................................................ 381/311
See application file for complete search history.

(56) References Cited

U.S. PATENT DOCUMENTS

| | | | |
|---|---|---|---|
| 2012/0224731 A1 | 9/2012 | Zellner | |
| 2014/0140674 A1 | 5/2014 | Jallad et al. | |
| 2014/0376737 A1 | 12/2014 | Goldman | |
| 2016/0283194 A1 | 9/2016 | Patil et al. | |
| 2017/0171697 A1 | 6/2017 | Song | |
| 2018/0088897 A1 | 3/2018 | Mathur | |
| 2018/0116003 A1 | 4/2018 | Gu et al. | |
| 2022/0394794 A1* | 12/2022 | Zhang | H04W 28/0215 |

OTHER PUBLICATIONS

Chinese Search Report Corresponding to Application No. 2021800194518 on Oct. 23, 2025.

* cited by examiner

SWITCHING BETWEEN MULTIPLE EARBUD ARCHITECTURES

This application is a 371 National Stage filing of PCT Application No. PCT/IB2021/000057, filed Feb. 11, 2021, which claims priority to, and the benefit of, U.S. Patent Application No. 62/975,630, filed Feb. 12, 2020, the full disclosures of which are hereby incorporated by reference.

TECHNICAL FIELD

This disclosure relates to a method for switching between a first audio source and a second audio source by an audio rendering system comprising a primary wireless speaker and at least one secondary wireless speaker, when the first audio source uses a first audio topology and the second audio source uses a second audio topology different from the first audio topology.

BACKGROUND ART

Most of the current Bluetooth audio rendering systems use a single acknowledged Bluetooth audio stream with the associated audio source. Indeed, the Bluetooth protocol, and especially the Advanced Audio Distribution Profile (A2DP), i.e. the Bluetooth profile defining how to send an audio stream on a Bluetooth link, was defined to support only a single point-to-point communication between an audio source and an audio rendering system.

Even true wireless earphones, which are systems comprising two independent Bluetooth rendering units in the form of separate earpieces, only have a single acknowledged Bluetooth audio stream with an audio source such as a smartphone because of this limitation of the Bluetooth protocol.

To remain compliant with the standard, two audio topologies have been developed to allow both Bluetooth earpieces to receive audio data.

A first audio topology is called forwarding audio topology and comprises a first acknowledged Bluetooth audio stream with a first Bluetooth earpiece, and the first Bluetooth earpiece relays audio data to a second Bluetooth earpiece using a second acknowledged Bluetooth audio stream.

A second audio topology is called eavesdropping audio topology, and comprises also a first acknowledged Bluetooth audio stream with a first Bluetooth earpiece, and the first earpiece provides information to the second earpiece so that said second earpiece can sniff/eavesdrop the audio stream sent on the wireless link between the audio source and the first earpiece. However, the second earpiece is never acknowledging the audio source directly (it generally acknowledges the first earpiece which is then going to acknowledge the audio source).

None of these audio topologies is optimal. The forwarding audio topology requires the first earpiece to retransmit audio data and the eavesdropping audio topology requires both earpieces to receive the same stereo audio stream (while only playing one audio channel among the two audio channels of a stereo audio stream). They require additional bandwidth usage which decreases the stability and increases the power consumption.

Also, the number of audio rendering systems receiving an audio stream from a single audio source is limited with these audio topologies.

Thus, new audio topologies have been developed to both improve the performances with respect to the existing ones and support new use cases. These new audio topologies include:

the dual stream audio topology which enables both earpieces to get a mono audio stream from the same audio source and thus reduces the power consumption;

the broadcast audio topology which provides the ability to an unlimited number of wireless earphones to get the same audio stream from a single audio source.

These audio topologies are for now out of the scope of the Bluetooth standard and only available on audio sources implementing these new capabilities as proprietary enhancements.

The audio topology is thus chosen during the connection setup process between the audio source and the wireless earphones, by exchanging respective audio topology capabilities. However, the configuration is always static, meaning that it won't change until all the audio sources are disconnected from the wireless earphones. Switching between two audio sources is done by disconnecting the first audio source and connecting to the second audio source, which degrades the user experience as it takes much more time.

The new specification for audio over Bluetooth Low Energy (BLE) aims at bringing these new audio topologies into the Bluetooth standard. However, the same problem will remain as existing Bluetooth audio rendering systems cannot implement it as it requires hardware changes.

Hence, there is a need for a solution that facilitates switching from a first audio source to a second audio source in a user experience friendly manner, e.g. reducing latency. This is especially needed since the introduction of new audio topologies in the BLE standard will increase the number of use cases where switching between different audio topologies might be required.

SUMMARY

The present disclosure aims at proposing a solution which overcomes all or part of the limitations discussed above.

In particular, the present disclosure aims at proposing a solution for switching from a first audio source to a second audio source in a user experience friendly manner.

Also, the present disclosure aims at proposing a solution that enables, in some embodiments at least, to limit the power consumption of the audio rendering system while enabling efficient switching.

For this purpose, and according to a first aspect, the present disclosure relates to a method for switching between a first audio source and a second audio source by an audio rendering system comprising a primary wireless speaker and at least one secondary wireless speaker, the audio rendering system receiving a first audio stream from the first audio source by using a first audio topology, said first audio topology corresponding to a first set of wireless links established between the primary wireless speaker, the secondary wireless speaker and the first audio source, wherein the method comprises steps of:

receiving a request to switch to receiving a second audio stream from the second audio source by using a second audio topology, said second audio topology corresponding to a second set of wireless links between the primary wireless speaker, the secondary wireless speaker and the second audio source, the second audio topology being different from the first audio topology;

establishing the second set of wireless links of the second audio topology;

starting receiving the second audio stream;

maintaining the audio rendering system and the first audio source connected by a wireless link of the first set of wireless links, while receiving the second audio stream.

The primary or the secondary wireless speaker can be a wireless earbud, a bookshelf speaker, a floor speaker, an outdoor speaker, a subwoofer, a headset speaker.

Hence, according to the present disclosure, when switching from a first audio source to a second audio source requiring using a second audio topology different from a first audio topology used with the first audio source, the audio rendering system (e.g. wireless earphones or speakers) maintains at least one of the wireless links of a first set of wireless links of the first audio topology while receiving the second audio stream from the second audio source.

The at least one wireless link maintained is a wireless link between the first audio source and one among the primary wireless speaker and the secondary wireless speaker, such that the first audio source and the audio rendering system remain connected while the audio rendering system receives and plays the second audio stream from the second audio source.

In the present disclosure, a wireless link between two entities means that the respective data link layers of said entities are configured and ready to exchange protocol data units using a wireless physical layer. The data link layer is the protocol layer right above the physical layer, and the wireless link may use either a connected mode or a connectionless mode to exchange protocol data units between said entities.

In the present disclosure, maintaining a wireless link relates to the case of a connected mode, and means that at least signaling data is recurrently exchanged over the wireless link to prevent any termination of the wireless link. Hence, it is assumed that the first audio topology comprises at least one wireless link in a connected mode, between the first audio source and the audio rendering system, which is maintained when switching from the first audio source to the second audio source.

Thanks to the fact that at least one wireless link is maintained between the audio rendering system and the first audio source, the first audio source is not disconnected from the audio rendering system. Hence, the receiving of the first audio stream needs not to be stopped in advance with respect to the starting of receiving the second audio stream. Accordingly, it is possible to switch to playing the second audio stream immediately after or even before stopping playing the first audio stream, resulting in an enhanced user experience.

Also, thanks to the fact that at least one wireless link is maintained between the audio rendering system and the first audio source while receiving the second audio stream, it will be possible to quickly process switch back requests (i.e. requests for switching back from the second audio source to the first audio source), thereby reducing switching latency and enhancing user experience.

The maintaining of at least one wireless link between the first audio source and the audio rendering system, by exchanging recurrently signaling data over said wireless link, can last e.g. as long as the audio rendering system and the first audio source are within range, and/or for a predetermined duration (e.g. until a predetermined timer expires), etc. This might also depend e.g. on the respective types of audio streams. For instance, if the first audio stream corresponds to music streaming and the second audio stream corresponds to a phone call, then a wireless link might be maintained for all the duration of the phone call, since it is likely that a switch back request will be received once the phone call (second audio stream) ends, triggered either automatically or manually by the user of the audio rendering system. In turn, if the first audio stream corresponds to a phone call and the second audio stream corresponds to music streaming, it is possible to maintain a wireless link between the audio rendering system and the first audio source for a predetermined duration, etc.

In specific embodiments, the method for switching can further comprise one or more of the following features, considered either alone or in any technically possible combination.

In a specific embodiment, when receiving the second audio stream, only one wireless link of the first set of wireless links is maintained between the primary wireless speaker and the first audio source, and any other wireless link of the first set of wireless links is not maintained, and may actually be actively terminated.

In such a case, the power consumption and the stability are optimized since the bandwidth usage is reduced by maintaining a single wireless link.

In a specific embodiment, when receiving the second audio stream and when the audio rendering system has previously received a third audio stream from a third audio source by using a third audio topology, said third audio topology comprising a third set of wireless links, only one wireless link of the third set of wireless links is maintained between the secondary wireless speaker and the third audio source, and any other wireless link of the third set of wireless links is not maintained.

Hence, when the audio rendering system remains connected to two audio sources (the first and third audio sources) while receiving an audio stream from another audio source (the second audio source), it may be advantageous to use different wireless speakers (among the first and second wireless speakers) to maintain wireless links with respectively the first and third audio sources, for load and power consumption balancing purposes.

In a specific embodiment, when receiving the second audio stream, all the wireless links of the first set of wireless links of the first audio topology are maintained.

In such a case, the power consumption and the stability are not optimized but any switch back request will be processed very quickly, since the whole first audio topology will have been maintained while receiving the second audio stream.

In a specific embodiment, the method for switching comprises:

obtaining a second audio configuration of the primary wireless speaker and of the secondary wireless speaker to be used with the second audio topology, different from a first audio configuration used with the first audio topology;

configuring the primary wireless speaker and the secondary wireless speaker with the second audio configuration before starting receiving the second audio stream.

For instance, the first and second audio configurations include at least one of the following parameters:

a role parameter;

a synchronization parameter;

an audio encoding parameter;

a channel mapping parameter.

In a specific embodiment, the method for switching comprises:

receiving a request to switch back to receiving the first audio stream from the first audio source;

if not all wireless links of the first set of wireless links have been maintained: establishing all the wireless links of the first set of wireless links of the first audio topology;

starting receiving the first audio stream;

maintaining the audio rendering system and the second audio source connected by a wireless link of the second set of wireless links, while receiving the first audio stream.

As discussed above, it is possible to maintain one or more wireless links of the second set of wireless links while receiving the first audio stream. It is also possible to maintain all the wireless links of the second set of wireless links while receiving the first audio stream.

In a specific embodiment, after having received a switch back request, the first audio topology is retrieved from data stored in a memory of the audio rendering system or received from the first audio source via the wireless link maintained between said audio rendering system and said first audio source.

In a specific embodiment, the first audio topology is one among the following audio topologies:

a forwarding audio topology;

an eavesdropping audio topology; and a dual stream audio topology; and the second audio topology is a different one among the following audio topologies:

a forwarding audio topology;

an eavesdropping audio topology;

a dual stream audio topology; and a broadcast audio topology.

In a specific embodiment, the dual stream audio topology uses two BLE connected isochronous stream, CIS, logical transports between the first or second audio source and respectively the primary wireless speaker and the secondary wireless speaker.

In a specific embodiment, the broadcast audio topology uses one BLE broadcast isochronous stream, BIS, logical transport between the first or second audio source and the primary and secondary wireless speakers.

In a specific embodiment, the method for switching comprises, when the first audio topology is a forwarding audio topology and the second audio topology is a dual stream audio topology, and the first set of wireless links consists in a wireless link between the secondary wireless speaker and the primary wireless speaker and a wireless link between the first audio source and the primary wireless speaker:

terminating the wireless link between the secondary wireless speaker and the primary wireless speaker; and changing a role parameter of the primary wireless speaker from master to slave.

According to a second aspect, the present disclosure relates to a computer program product comprising instructions which, when executed by an audio rendering system comprising a primary wireless speaker and at least one secondary wireless speaker, each of the primary and secondary wireless speakers comprising a processing circuit, a wireless communication unit and an audio rendering unit, configure said audio rendering system to carry out a switching method according to any one of the embodiments of the invention.

According to a third aspect, the present disclosure relates to an audio rendering system comprising a primary wireless speaker and at least one secondary wireless speaker, each of the primary and secondary wireless speakers comprising a processing circuit, a wireless communication unit and an audio rendering unit, wherein the audio rendering system is configured to carry out a switching method according to any one of the embodiments of the invention.

In specific embodiments, the audio rendering system can further comprise one or more of the following features, considered either alone or in any technically possible combination.

In a specific embodiment, the audio rendering system corresponds to wireless earphones.

In a specific embodiment, the wireless communication units are Bluetooth communication units, preferably BLE communication units.

BRIEF DESCRIPTION OF DRAWINGS

The invention will be better understood upon reading the following description, given as an example that is in no way limiting, and made in reference to the figures which show.

Figure 1:
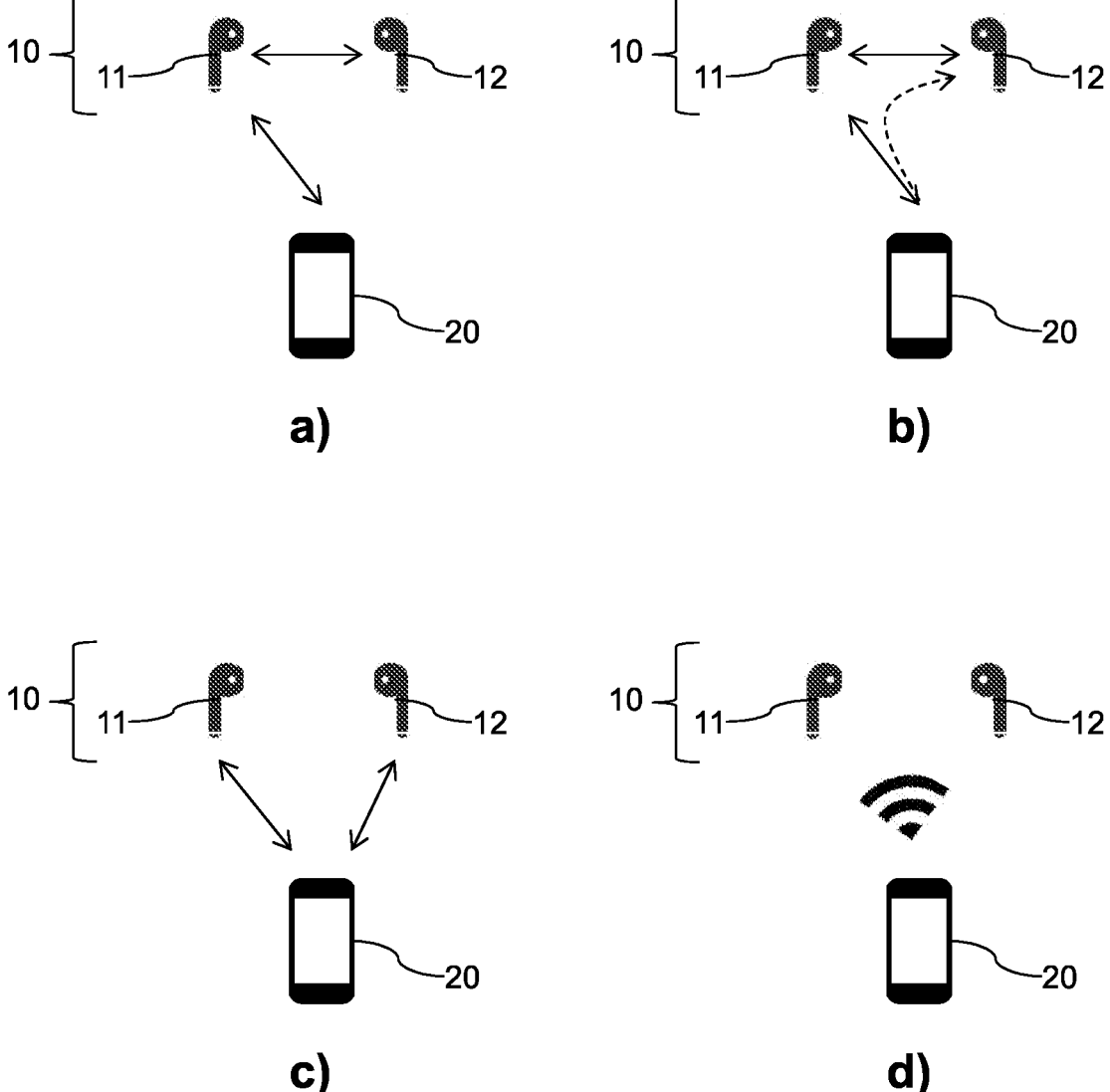
FIG. 1: a schematic representation of different audio topologies between an audio rendering system and an audio source.

In these figures, references identical from one figure to another designate identical or analogous elements. For reasons of clarity, the elements shown are not to scale, unless explicitly stated otherwise.

DESCRIPTION OF EMBODIMENTS

In the present disclosure, an audio source can be any device capable of sending an audio stream over one or more wireless links. An audio source can be e.g. a smartphone, a laptop, a voice assistant, a tablet, etc.

An audio rendering system 10 can be any device capable of receiving an audio stream over a wireless link, and of playing the received audio stream content to make it perceivable by a user. Also, the audio rendering system 10 comprises a primary wireless speaker 11 and at least one secondary wireless speaker 12. Each of these speakers are "wireless" in the sense that the audio data to be played by each wireless speaker is received over a wireless link. Each of the primary and secondary wireless speakers 11, 12 may be e.g. a wireless loudspeaker, a wireless acoustic or bone conduction earpiece, a wireless subwoofer, etc.

This disclosure relates to a method 50 for switching between a first audio source 20 and a second audio source 21 by an audio rendering system 10, when the first audio source 20 and the second audio source 21 use different audio topologies. Each audio topology corresponds to a set of at least one wireless link established between the primary wireless speaker 11, the secondary wireless speaker 12 and the audio source 20, 21.

For instance, the audio rendering system 10 corresponds to wireless earphones, but the present disclosure is not limited thereto and can be applied to any type of audio rendering system 10 comprising a primary wireless speaker 11 and at least one secondary wireless speaker 12.

FIG. 1 represents schematically non-limitative examples of different audio topologies that can be used in the present disclosure.

Part a) of FIG. 1 illustrates a first audio topology, referred to as "forwarding audio topology". In the forwarding audio topology, the set of wireless links comprises two wireless links. A first wireless link is established between the audio source 20 and the primary wireless speaker 11. A second wireless link is established between the primary wireless speaker 11 and the secondary wireless speaker 12, to allow the primary wireless speaker 11 to forward to the secondary wireless speaker 12 the audio data (e.g. a specific audio channel of a stereo audio stream) that is to be played by said secondary wireless speaker 12. In the forwarding audio topology, there is no wireless link established between the audio source 20 and the secondary wireless speaker 12.

Part b) of FIG. 1 illustrates a second audio topology, referred to as "eavesdropping audio topology". In the eavesdropping audio topology, the set of wireless links comprises two wireless links. A first wireless link is established between the audio source 20 and the primary wireless speaker 11. A second wireless link is established between the primary wireless speaker 11 and the secondary wireless speaker 12, to allow the primary wireless speaker 11 to provide information regarding the first wireless link to the secondary wireless speaker 12, so that the secondary wireless speaker 12 can sniff/eavesdrop the audio stream content sent on the first wireless link (represented by a dotted line) without being actually connected to the audio source 20.

Part c) of FIG. 1 illustrates a third audio topology, referred to as "dual stream audio topology". In the dual stream audio topology, the set of wireless links comprises two wireless links. A first wireless link is established between the audio source 20 and the primary wireless speaker 11. A second wireless link is established between the audio source 20 and the secondary wireless speaker 12. Each of the primary and secondary wireless speakers 11, 12 receives its own audio data (e.g. a specific audio channel of a stereo audio stream) through a separate point-to-point wireless link with the audio source 20.

Part d) of FIG. 1 illustrates a fourth audio topology, referred to as "broadcast audio topology". In the broadcast audio topology, the set of wireless links comprises a single wireless link that generally uses a connectionless mode. Hence, in the broadcast audio topology, the audio source 20 and the audio rendering system 10 are not necessarily connected at the data link layer level. From the audio source 20 standpoint, there is only a single data link layer configuration that is used to send protocol data units to both the primary wireless speaker 11 and the secondary wireless speaker 12, over different respective wireless paths. Each of the primary and secondary wireless speakers 11, 12 receives the whole audio stream through a separate wireless path with the audio source 20. Compared with the dual stream audio topology, there is only one transmission by the audio source 20 that may be received by multiple receivers (not only the primary and secondary wireless speakers 11, 12), through separate wireless paths of a point-to-multipoint architecture.

Figure 2:
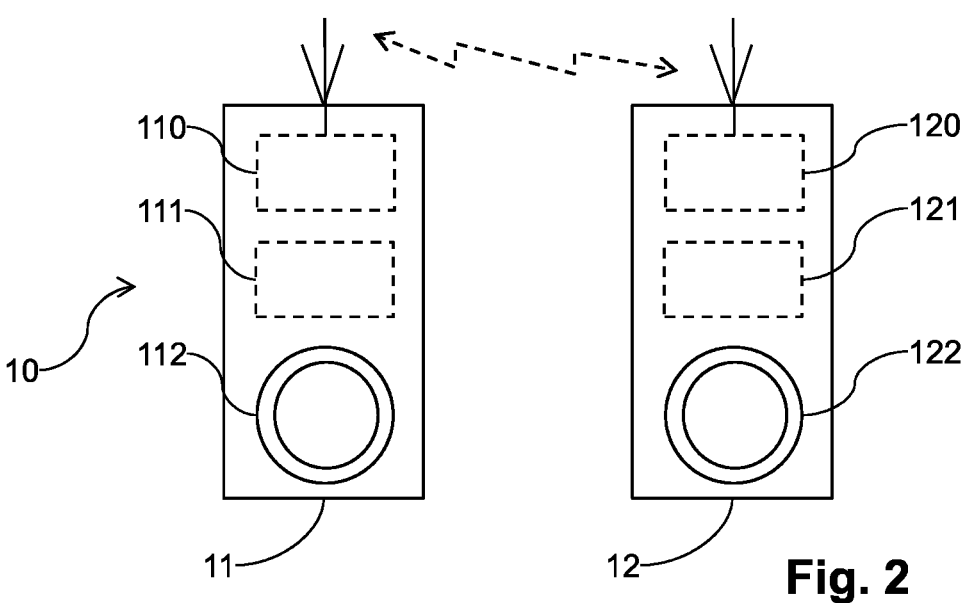
FIG. 2: a schematic representation of an exemplary embodiment of an audio rendering system.

FIG. 2 represents schematically the main components of an exemplary embodiment of an audio rendering system 10.

As illustrated by FIG. 2, the audio rendering system 10 comprises a primary wireless speaker 11 and at least one secondary wireless speaker 12. For instance, each of the primary and secondary wireless speakers 11, 12 may be a wireless loudspeaker, a wireless earpiece, a wireless subwoofer, etc.

Each of the primary wireless speaker 11 and of the secondary wireless speaker 12 comprises also a wireless communication unit 110, 120, a processing circuit 111, 121 and an audio rendering unit 112, 122.

Each wireless communication unit 110, 120 is used to establish wireless links with audio sources, and corresponds for instance to a radiofrequency circuit comprising components (antenna(s), amplifier(s), local oscillator(s), mixer(s), analog and/or digital filter(s), etc.) considered known to the skilled person. The wireless communication unit 110, 120 implements at least one wireless communication protocol. For instance, the wireless communication unit 110, 120 can comprise at least one of the following:

- a Bluetooth communication unit;
- an Ultra Wide-Band (UWB) communication unit;
- a Wi-Fi communication unit;
- a ZigBee communication unit, etc.

For example, each processing circuit 111, 121 comprises one or more processors and storage means (magnetic hard disk, solid-state disk, optical disk, electronic memory, etc.) in which a computer program product is stored, in the form of a set of program-code instructions to be executed in order to implement all or a part of the steps of a method 50 for switching between a first audio source 20 and a second audio source 21. Alternatively, or in combination thereof, the processing circuit 111, 121 can comprise one or more programmable logic circuits (FPGA, PLD, etc.), and/or one or more specialized integrated circuits (ASIC), and/or a set of discrete electronic components, etc., adapted for implementing all or part of said steps of the switching method 50.

Each audio rendering unit 112, 122 may be any suitable equipment adapted to make an audio stream hearable by a user. Hence, each audio rendering unit 112, 122 may be e.g. any kind of electroacoustic transducer.

The processing circuits 111, 121, the wireless communication units 110, 120 and the audio rendering units 112, 122 of the audio rendering system 10 form a set of means configured by software (specific computer program product) and/or by hardware (processor, FPGA, PLD, ASIC, discrete electronic components, radiofrequency circuit, electroacoustic transducer, etc.) to implement the steps of a switching method 50 discussed below.

In the following description, the wireless communication units 110, 120 of the audio rendering system 10 are considered, in a non-limitative manner, to be Bluetooth communication units. Hence, the wireless links established by the audio rendering system 10 with an audio source, and between the primary wireless speaker 11 and the secondary wireless speaker 12, are considered to be Bluetooth links.

In the present disclosure, an audio stream corresponds to application-level data representing an audio signal. For instance, it can be a bit stream coming from an audio streaming application, a music file stored locally read by an application, the output of an audio server, etc. The audio stream content corresponds to the useful data (vs. metadata) representing the audio data that is actually played by the audio rendering system 10. The audio stream content can comprise one or more audio channels (e.g. mono or stereo music, etc.).

A Bluetooth audio stream refers to the Bluetooth terminology and designates the logical communication for streaming the application-level audio stream content between an audio source and the audio rendering system 10.

A Bluetooth audio stream uses Bluetooth packets on a single Bluetooth logical link (multiple Bluetooth audio streams can use the same logical link).

For instance, the dual stream audio topology may use two Bluetooth audio streams, using respective BLE connected isochronous stream (CIS) logical transports between the audio source and respectively the primary wireless speaker 11 and the secondary wireless speaker 12. As an example, the broadcast audio topology may use one Bluetooth audio stream using one BLE broadcast isochronous stream (BIS) logical transport between the audio source and the primary and secondary wireless speakers 11, 12.

Also, as discussed above, the audio rendering system 10 is referred to as "connected" by a wireless link with an audio source when their respective data link layers are configured and ready to exchange protocol data units using a connected mode.

Also, an audio stream is referred to as "active" when the audio stream content is transmitted over the air from the audio source to the audio rendering system 10, and the audio rendering system 10 processes the wireless signals received to extract the audio stream content transmitted by the audio source. An audio stream is referred to as "inactive" when no audio stream content is transmitted over the air or when the audio stream content is transmitted over the air but is not extracted by the audio rendering system 10 from the wireless signals received.

Figure 3:
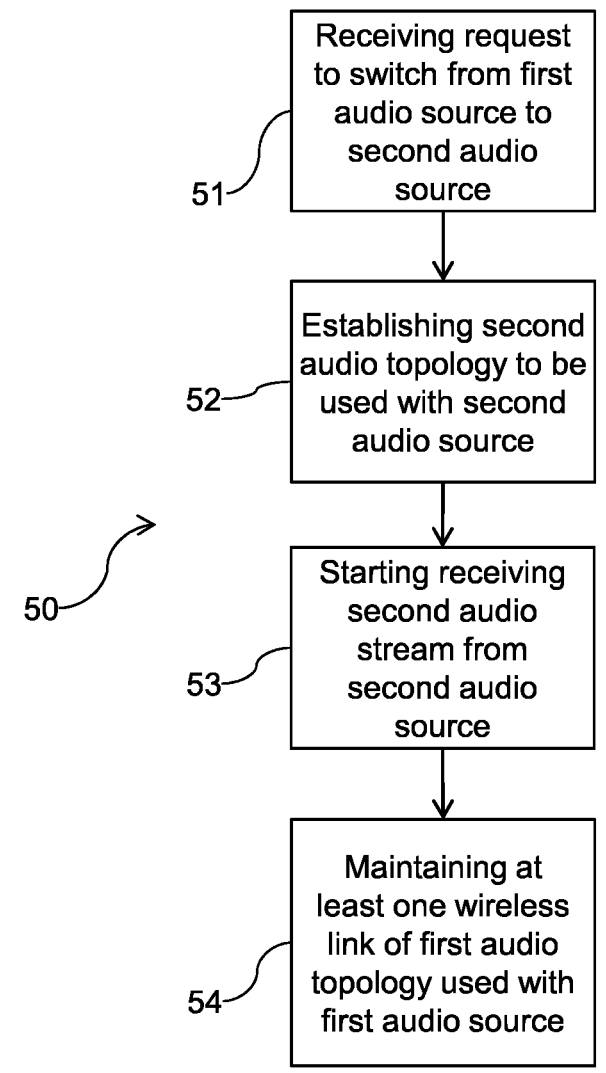
FIG. 3: a diagram representing the main steps of an exemplary embodiment of a method for switching between different audio sources.

FIG. 3 represents schematically the main steps of an exemplary embodiment of a method 50 for switching between a first audio source 20 and a second audio source 21, said steps being carried out by the audio rendering system 10.

As illustrated by FIG. 3, said switching method 50 comprises a step 51 of receiving a request to switch to receiving a second audio stream from the second audio source 21 by using a second audio topology comprising a second set of wireless links between the primary wireless speaker 11, the secondary wireless speaker 12 and the second audio source 21.

The second audio topology is different from the first audio topology and may be determined based on different parameters.

For instance, the second audio topology can be, in some embodiments, determined based on audio source capabilities of the second audio source 21. In that case, when establishing a first wireless link between the audio rendering system 10 and the second audio source 21, the second audio source 21 may provide a list of supported audio topologies. This list may be stored in a memory of the audio rendering system 10 for later use. When receiving a request to switch to the second audio source 21, this list may be retrieved, and the second audio topology may be chosen among the supported audio topologies. According to another example, the second audio source 21 may explicitly request that a specific audio topology is used as the second audio topology.

According to yet another example, the second audio topology can be, in some embodiments, determined based on audio stream capabilities. Indeed, it is possible that the second audio stream requires using a specific audio topology as the second audio topology. In that case, when receiving a request to switch to the second audio source 21, the audio rendering system 10 may determine that the second audio stream requires using a specific audio topology, and therefore selects this specific audio topology as the second audio topology.

Based on the above discussion, it is understood that the second audio topology may be determined when a first wireless link is established between the second audio source 21 and the audio rendering system 10 (for instance by reading the audio source capabilities of the second audio source 21), when detecting that a new audio stream is available (for instance in a new audio stream indication broadcast message or unicast request), etc.

Also, it is emphasized that the switch request may be triggered by the second audio source 21 or the first audio source 20, triggered manually by a user, triggered automatically by the audio rendering system 10 e.g. based on respective priorities of the audio streams available from different audio sources connected to the audio rendering system 10, etc.

Once the audio rendering system 10 has received a switch request, the switching method 50 comprises a step 52 of establishing all the wireless links of the second set of wireless links of the second audio topology, in order to be able to receive the second audio stream by using the second audio topology.

It should be noted that, in some cases, switching from the first audio topology to the second audio topology might require not only establishing a new set of wireless links, but also changing the audio configuration of the primary and secondary wireless speakers 11, 12. The audio configuration of the primary and secondary wireless speakers 11, 12 corresponds to the values of parameters that impact the behavior of the audio rendering system 10 on the wireless links established. For instance, the first and second audio configurations (associated respectively to the first audio topology and the second audio topology) include at least one of the following parameters:

a role parameter;
  a synchronization parameter;
  an audio encoding parameter;
  a channel mapping parameter, etc.

The role parameter indicates, for each wireless link established by the audio rendering system 10, whether the primary or secondary wireless speaker 11, 12 behaves on this wireless link as a "master" or as a "slave". For instance, in the forwarding audio topology, the primary wireless speaker 11, involved in both wireless links of the set of wireless links, may act as "master" on both of said wireless links. In turn, the secondary wireless speaker 12 may act as "slave" on the single wireless link it is involved in. In the dual stream audio topology, both the primary and secondary wireless speakers 11, 12 may act as "slaves" on the wireless links with the audio source, etc.

The synchronization parameter indicates how the audio data played respectively by the primary and secondary wireless speakers 11, 12 are synchronized in time. For instance, in the forwarding audio topology, the primary wireless speaker 11 may first evaluate the streaming clock value, then convert it into a value of a local clock synchronized between the primary and the secondary wireless speakers 11, 12 and use it to timestamp the audio data forwarded to the secondary wireless speaker 12. In a dual stream audio topology, the Bluetooth clock may be directly used to timestamp the audio data by the audio source, so no conversion into a local clock value is required.

The audio encoding parameter indicates which type of audio codec is used. For instance, a dual stream audio topology may use higher bitrate audio codecs e.g. because each of the primary and secondary wireless speakers 11, 12 receives only one audio channel among the two audio channels of a stereo audio stream. In turn, the forwarding audio topology might use lower bitrate audio codecs. The type of audio codec used might also depend on the capabilities of the audio source.

The channel mapping parameter indicates how audio channels are mapped. For instance, in the forwarding audio topology, the primary wireless speaker 11 receives both audio channels of a stereo audio stream, plays only its own audio channel and forwards the other one to the secondary wireless speaker 12. In the dual stream audio topology, each of the primary and secondary wireless speakers 11, 12 receives only a mono audio stream corresponding to its own audio channel of the stereo audio stream. In the broadcast audio topology, each of the primary and secondary wireless speakers 11, 12 receives the stereo audio stream but plays only its own audio channel of the stereo audio stream.

Of course, other parameters may be included in the audio configuration, in combination with or in replacement of the parameters above.

Hence, switching from the first audio source 20 to the second audio source 21 might require also switching from a first audio configuration to a second audio configuration. If required, the switching method 50 may comprise additional optional steps of:

obtaining a second audio configuration of the primary wireless speaker 11 and of the secondary wireless speaker 12 to be used with the second audio topology;

configuring the primary wireless speaker 11 and the secondary wireless speaker 12 with the second audio configuration before starting receiving the second audio stream.

Once the second audio topology is operational, the switching method 50 comprises a step 53 of starting receiving the second audio stream, in order to play the second audio stream by the audio rendering system 10.

While the audio rendering system 10 receives the second audio stream from the second audio source 21, the switching method 50 comprises a step 54 of maintaining at least one wireless link of the first set of wireless links such that the audio rendering system 10 and the first audio source 20 remain connected.

In some embodiments, it is possible to maintain only a single wireless link between the first audio source and one of the primary and secondary wireless speakers 11, 12. In other embodiments it is possible to maintain more than one wireless link, including maintaining all the wireless links of the first set such that the first audio topology coexists with the second audio topology. Also, it is possible to vary the number of maintained wireless links over time. For instance, it is possible to first maintain all the wireless links of the first for a predetermined duration, and then to terminate some of the wireless links until only one wireless link of the first set is maintained between the first audio source 20 and the audio rendering system 10, etc.

Thanks to the fact that the first audio topology is at least partially maintained, the first audio stream may remain active longer than with the solutions of the prior art, thereby enhancing user experience. Also, any switch back request, in order to switch back to receiving an audio stream from the first audio source will be received and processed more quickly than with the solutions of the prior art.

Figure 4:
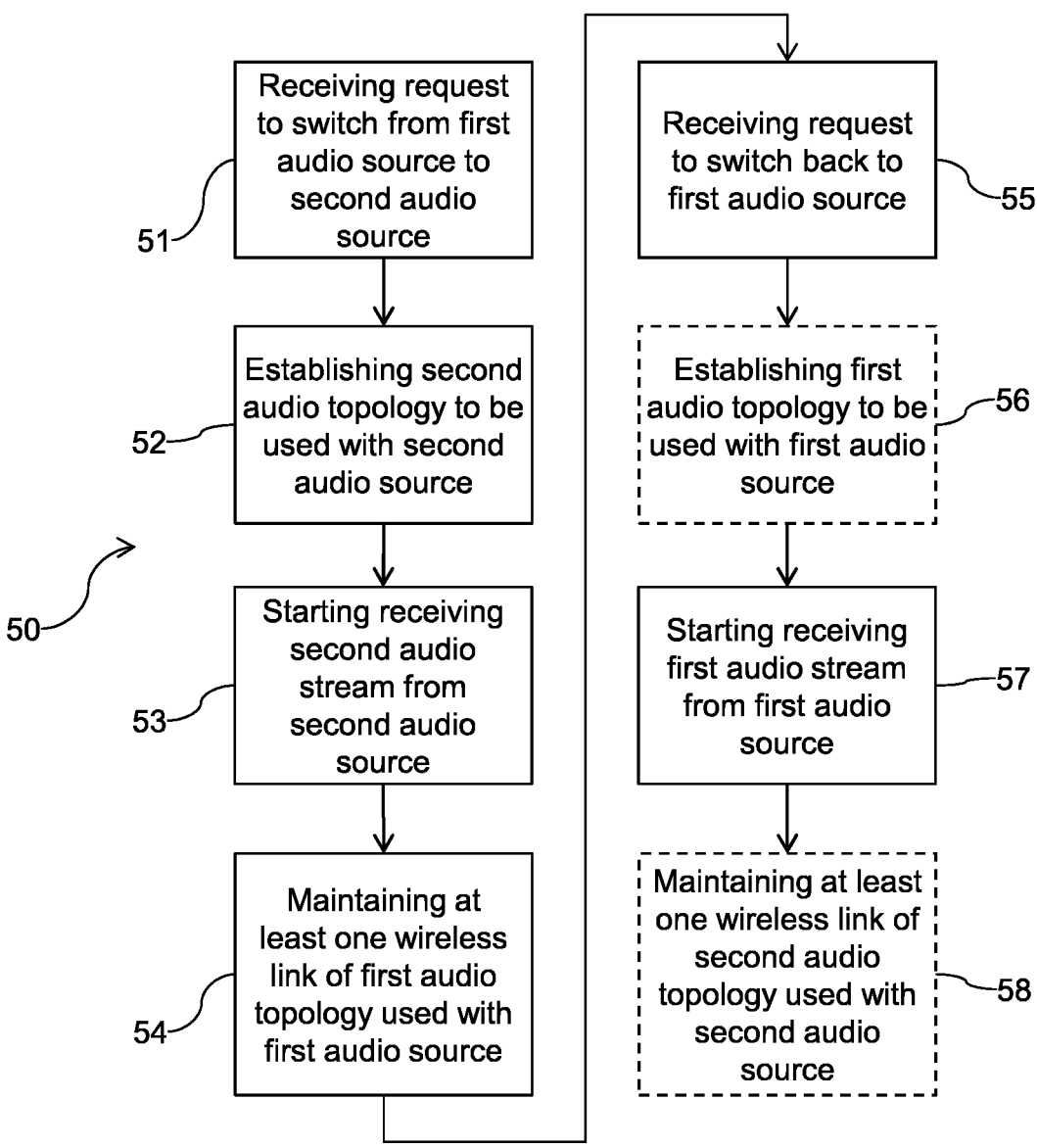
FIG. 4: a diagram representing the main steps of another exemplary embodiment of a method for switching between different audio sources.

FIG. 4 represents schematically the main steps of an exemplary embodiment of the switching method 50. As illustrated in FIG. 4, the switching method 50 comprises all the steps illustrated in FIG. 3.

At some point in time after having started to receive the second audio stream from the second audio source 21, the switching method 50 comprises a step 55 of receiving, by the audio rendering system 10, a request to switch back to receiving the first audio stream from the first audio source 20. As discussed above for the switch request (step 51), the switch back request may be triggered by the second audio source 21 or the first audio source 20, triggered manually by a user, triggered automatically by the audio rendering system 10 e.g. based on respective priorities of the audio streams available from different audio sources connected to the audio rendering system 10, etc.

As discussed above, at least one wireless link of the first set of wireless links of the first audio topology is maintained. If all wireless links of the first set of wireless links have been maintained, then there is no need to re-establish wireless links of the first audio topology. If not all wireless links of the first set of wireless links have been maintained, then the switching method 50 comprises a step 56 of establishing all the wireless links of the first set of wireless links of the first audio topology, during which the unmaintained wireless links of the first set of wireless links are reestablished.

It should be noted that the first audio topology as defined by the first set of wireless links may be stored in a memory of the audio rendering system 10. Hence, when receiving the switch back request, the first audio topology is quickly determined by being retrieved in said memory. Alternately, the first audio topology may also be received from the first audio source 20 via the wireless link maintained between said audio rendering system 10 and said first audio source 20. Indeed, thanks to the fact that a wireless link has been maintained with the first audio source 20, this information can also be retrieved quickly.

As mentioned previously, in order to have the first audio topology operational, it might be required to change also the audio configuration of the primary and secondary wireless speakers 11, 12. Preferably, the first audio configuration that was used with the first audio source 20 before switching to the second audio source 21 is stored in a memory of the audio rendering system 10. In that case, the first audio configuration can be retrieved from the memory in order to configure more quickly the primary and secondary wireless speakers 11, 12. Alternately, the first audio configuration may also be received from the first audio source 20 via the wireless link maintained between said audio rendering system 10 and said first audio source 20.

Once the first audio topology is operational, the switching method 50 comprises a step 57 of starting receiving the first audio stream from the first audio source 20, i.e. the first audio stream (re) becomes active.

Preferably, the switching method 50 comprises an optional step 58 of maintaining the audio rendering system 10 and the second audio source 21 connected by at least one wireless link of the second set of wireless links, while receiving the first audio stream. All that has been said previously in relation with maintaining at least one wireless link of the first set of wireless links applies also here. In particular, it is possible to maintain all the wireless links of the second set of wireless links of the second audio topology, in order to be able to speed up the switching back to the second audio source 21 if requested.

The present disclosure relates to any switching from a first audio topology to a second audio topology different from the first audio topology. However, the following use cases are of particular interest:

the first audio topology is a forwarding audio topology and the second audio topology is a dual stream audio topology or a broadcast audio topology;

the first audio topology is an eavesdropping audio topology and the second audio topology is a dual stream audio topology or a broadcast audio topology.

Figure 5:
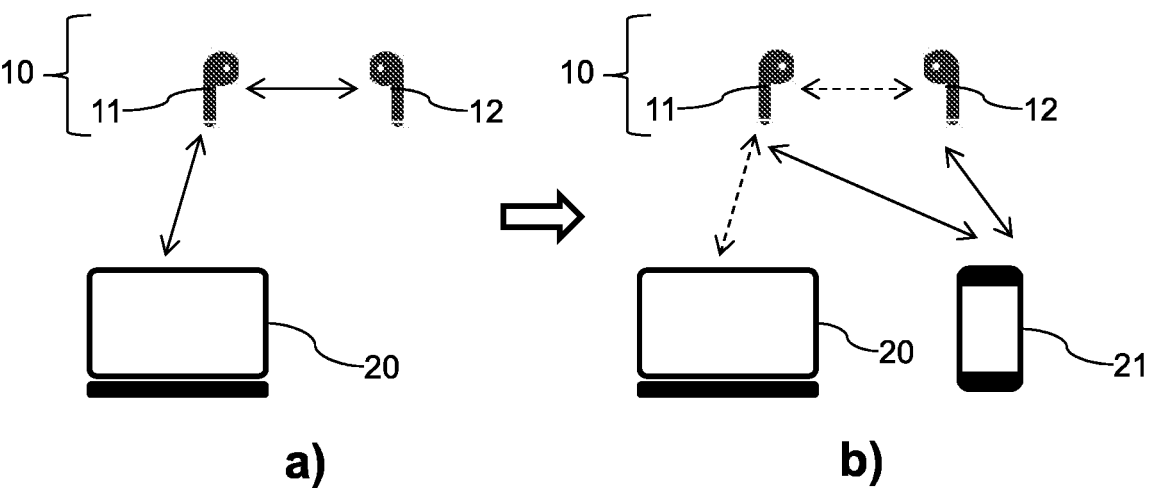
FIGS. 5 and 6: schematic representations of switching scenarios.

FIG. 5 represents schematically a switch from the forwarding audio topology to the dual stream audio topology.

In part a) of FIG. 5, the audio rendering system 10 (wireless earphones) receives a first audio stream from a first audio source 20 (a laptop) using a forwarding audio topology. With the forwarding audio topology, the first audio source 20 is connected to the primary wireless speaker 11 by a first wireless link and the primary wireless speaker 11 is connected to the secondary wireless speaker 12 by a second wireless link.

In part b) of FIG. 5, the audio rendering system 10 switches to receiving a second audio stream from a second audio source 21 (a smartphone) using a dual stream audio topology. With the dual stream audio topology, the first audio source 20 is connected to the primary wireless speaker 11 by a first wireless link and to the secondary wireless speaker 12 by a second wireless link. As illustrated in part b) of FIG. 5, the wireless links of the forwarding audio topology (represented by dotted lines) are maintained while the audio rendering system 10 receives the second audio stream.

Figure 6:
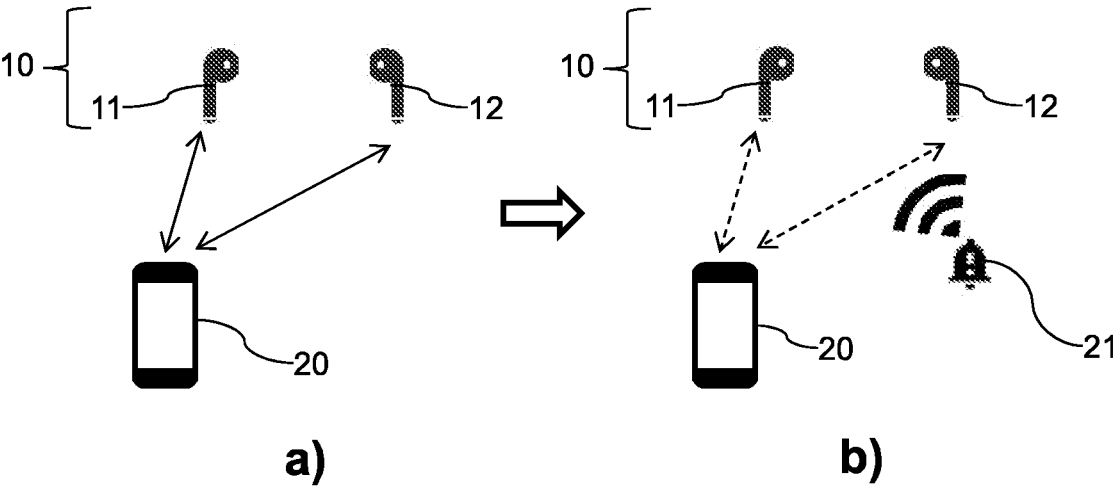

FIG. 6 represents schematically a switch from the dual stream audio topology to the broadcast audio topology.

In part a) of FIG. 6, the audio rendering system 10 (wireless earphones) receives a first audio stream from a first audio source 20 (a smartphone) using a dual stream audio topology. With the dual stream audio topology, the first audio source 20 is connected to the primary wireless speaker 11 by a first wireless link and to the secondary wireless speaker 12 by a second wireless link.

In part b) of FIG. 6, the audio rendering system 10 switches to receiving a second audio stream from a second audio source 21 (an alarm, such as a fire alarm) using a broadcast audio topology. As illustrated in part b) of FIG. 6, the wireless links of the dual stream audio topology (represented by dotted lines) are maintained while the audio rendering system 10 receives the second audio stream.

Figure 7:
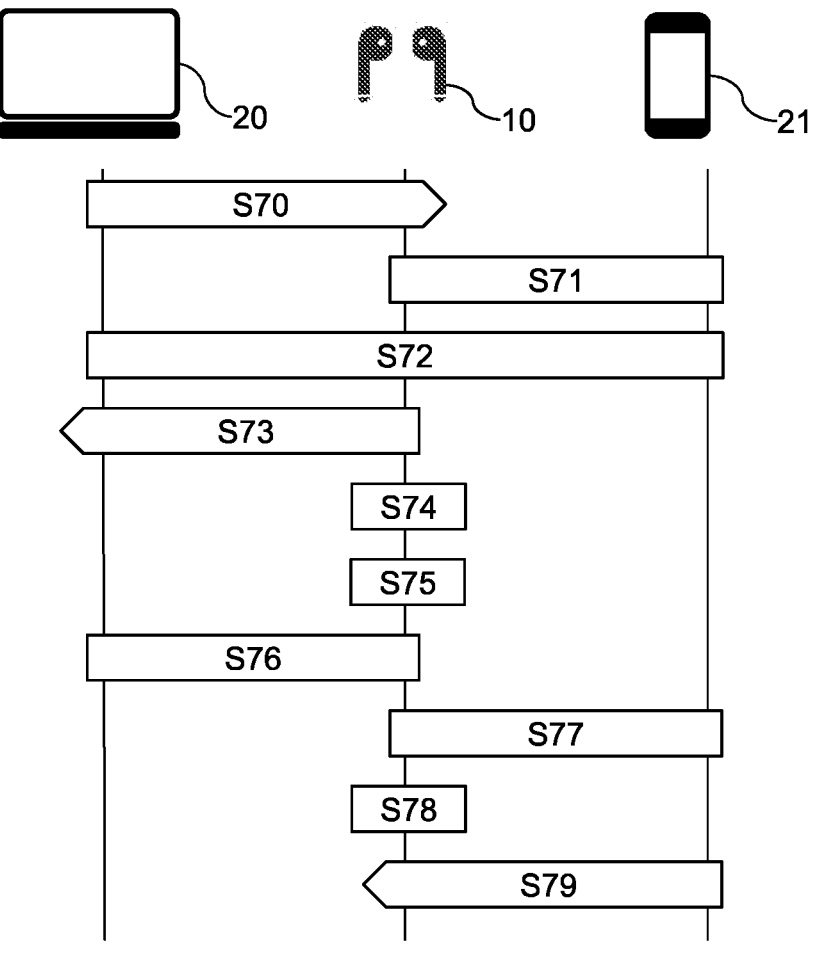
FIG. 7: a diagram illustrating an exemplary embodiment of a switching, by an audio rendering system, from a forwarding audio topology to a dual stream audio topology.

FIG. 7 represents an exemplary embodiment showing how the switching method 50 may be implemented, in the case of a switching from a forwarding audio topology with a first audio source (a laptop) to a dual stream audio topology with a second audio source 21 (a smartphone).

Initially, a first audio stream from the first audio source 20 is active, such that the first audio stream content is transmitted by the first audio source 20 and received by the audio rendering system 10 (wireless earphones) (reference S70). Then, the second audio source 21 establishes a wireless link with the primary wireless speaker 11 (reference S71), and a switch request is received indicating that the audio rendering system 10 should switch to the second audio source 21 (reference S72). In the example illustrated, the audio rendering system 10, based on the received switch request, requests the first audio source 20 to stop transmitting the first audio stream (reference S73), such that the first audio stream becomes inactive. Then, the audio rendering system 10 determines the second audio topology (reference S74), for instance based on the audio source capabilities of the second audio source 21, previously stored by the audio rendering system 10 and/or received from the second audio source 21, or based on the audio stream capabilities of the second audio stream, etc. Then, the audio rendering system 10 terminates the wireless link of the forwarding audio topology between the secondary wireless speaker 12 and the primary wireless speaker 11 (reference S75). Also, the audio rendering system

10 and the first audio source 20 change the role of the primary wireless speaker 11 on the wireless link of the forwarding audio topology between the first audio source 20 and the primary wireless speaker 11. The role of the primary wireless speaker 11 is changed from "master" to "slave" and the wireless link of the forwarding audio topology between the first audio source 20 and the primary wireless speaker 11 is maintained (reference S76). Then, the audio rendering system 10 establishes with the second audio source 21 the wireless links of the set of wireless links of the dual stream audio topology. Since the primary wireless speaker 11 is already connected to the second audio source 21 by a wireless link, only a wireless link between the second audio source 21 and the secondary wireless speaker 12 is established (reference S77). Then the audio rendering system 10 configures the primary wireless speaker 11 and the secondary wireless speaker 12 with the audio configuration to be used with the dual stream audio topology (reference S78). Finally, the second audio stream is activated, such that the second audio stream content is transmitted by the second audio source 21 and processed by the audio rendering system 10 (reference S79), while the first audio source 20 and the primary wireless speaker 11 remain connected by a wireless link of the forwarding audio topology.

It should be noted that the sequence of operations represented in FIG. 7 is exemplary and that other sequences are possible. For example, in FIG. 7, the first audio stream is deactivated immediately after the switch request is received. However, the first audio stream may also be deactivated later on and may even be deactivated after the second audio stream is activated (especially if the first audio topology is fully maintained and coexists with the second audio topology).

It should be noted that it is possible to have, in some embodiments, at most one active audio stream. In that case, the first audio stream needs to be deactivated before the second audio stream is activated, in a kind of "break before make" approach. Hence, the audio rendering system 10 stops the reception of the first audio stream before starting the reception of the second audio stream. Such an approach is advantageous in that it may reduce the power consumption and the processing of the audio rendering system 10.

It should be noted that, in the present disclosure, stopping the reception of an audio stream means that the audio rendering system stops extracting the audio stream content from the wireless signals received from the audio source. It may imply, with wireless links using a connected mode, exchanging signaling between the audio source and the audio rendering system 10 to ensure that the audio source stops the transmission of the audio stream content to the audio rendering system 10. For instance, the audio rendering system 10 may stop the reception of audio stream content by sending an audio/video distribution transport protocol (AVDTP) suspend request to the audio source which, in response, suspends the Bluetooth audio stream such that the transmission of the (application-level) audio stream content is stopped. When considering the broadcast audio topology, the transmission of the audio stream content by the audio source is not stopped but the audio rendering system 10 just needs to stop processing the wireless signals to extract the audio stream content broadcasted by the audio source.

Also, starting the reception of an audio stream means that the audio rendering system starts extracting the audio stream content from the wireless signals received from the audio source. Of course, this may imply, with wireless links using a connected mode, exchanging signaling between the audio source and the audio rendering system 10 to ensure that the audio source starts the transmission of the audio stream content to the audio rendering system 10. For instance, the audio rendering system 10 may start the reception of audio stream content by sending an AVDTP start request to the audio source (which, in response, starts the Bluetooth audio stream and starts the transmission of the application-level audio stream content), and by starting to extract the audio stream content from the received wireless signals. When considering the broadcast audio topology, the transmission of the audio stream content by the audio source is ongoing such that the audio rendering system 10 just needs to start processing the wireless signals to extract the audio stream content broadcasted by the audio source.

In other embodiments, it is possible to have, at least temporarily, two (or more) audio streams active simultaneously. In that case, it is possible to play only one audio stream content at the time. Hence, the audio rendering system 10 stops playing the first audio stream content before starting to play the second audio stream content by the audio rendering units 112, 122. The first audio stream content, still received and extracted by the audio rendering system 10, is e.g. trashed without being played by the audio rendering units 112, 122. However, it is also possible, in other embodiments, to play simultaneously the first and second audio stream contents at least temporarily, for instance by ducking the first audio stream content with the second audio stream content.

It is emphasized that the present invention is not limited to the above exemplary embodiments. Variants of the above exemplary embodiments are also within the scope of the present invention.

For instance, the exemplary embodiments have been described by focusing on the fact that the wireless links are Bluetooth links. However, in other embodiments, it is also possible to use other wireless communication protocols. In some embodiments, the audio rendering system 10 may even support a plurality of wireless communication protocols and may use different wireless communication protocols to connect wirelessly to different devices.

The invention claimed is:

1. A method for switching between a first audio source and a second audio source by an audio rendering system comprising a primary wireless speaker and at least one secondary wireless speaker, wherein the method comprises:

receiving a request to switch from receiving a first audio stream from the first audio source using a first audio topology to receiving a second audio stream from the second audio source using a second audio topology, wherein:

said first audio topology corresponds to a first set of wireless links established between the primary wireless speaker, the secondary wireless speaker, and the first audio source, and said second audio topology corresponds to a second set of wireless links between the primary wireless speaker, the secondary wireless speaker, and the second audio source, the second audio topology being different from the first audio topology;

in response to the request to switch, changing an audio configuration of at least one of the primary wireless speaker and the secondary wireless speaker, by changing at least one parameter;

establishing the second set of wireless links of the second audio topology;

starting to receive the second audio stream, wherein:

when receiving the second audio stream, only one wireless link of the first set of wireless links is maintained between the primary wireless speaker and the first audio source, and any other wireless link of the first set of wireless links is not maintained; and when receiving the second audio stream and when the audio rendering system has previously received a third audio stream from a third audio source by using a third audio topology, said third audio topology corresponding to a third set of wireless links, only one wireless link of the third set of wireless links is maintained between the secondary wireless speaker and the third audio source, and any other wireless link of the third set of wireless links is not maintained; and maintaining the audio rendering system and the first audio source connected by a wireless link of the first set of wireless links, while receiving the second audio stream.

2. The method according to claim 1, comprising:

obtaining a second audio configuration of the primary wireless speaker and of the secondary wireless speaker to be used with the second audio topology, different from a first audio configuration used with the first audio topology; and configuring the primary wireless speaker and the secondary wireless speaker with the second audio configuration before starting receiving the second audio stream.

3. The method according to claim 2, wherein the first and second audio configurations include at least one of the following parameters:

a role parameter;

a synchronization parameter;

an audio encoding parameter; and a channel mapping parameter.

4. The method according to claim 1, comprising:

receiving a request to switch back to receiving the first audio stream from the first audio source;

if not all wireless links of the first set of wireless links have been maintained:

establishing all the wireless links of the first set of wireless links of the first audio topology;

starting receiving the first audio stream; and maintaining the audio rendering system and the second audio source connected by a wireless link of the second set of wireless links, while receiving the first audio stream.

5. The method according to claim 1, wherein the first audio topology is one among the following audio topologies:

a forwarding audio topology;

an eavesdropping audio topology; and a dual stream audio topology;

and the second audio topology is a different one among the following audio topologies:

a forwarding audio topology;

an eavesdropping audio topology;

a dual stream audio topology; and a broadcast audio topology.

6. The method according to claim 5, wherein:

the dual stream audio topology uses two Bluetooth Low Energy connected isochronous stream logical transports between the first or second audio source and respectively the primary wireless speaker and the secondary wireless speaker; and/or the broadcast audio topology uses one Bluetooth Low Energy broadcast isochronous stream logical transport between the first or second audio source and the primary and secondary wireless speakers.

7. An audio rendering system comprising a primary wireless speaker and at least one secondary wireless speaker, each of the primary and secondary wireless speakers comprising a processing circuit, a wireless communication unit and an audio rendering unit, wherein the audio rendering system is configured to carry out a method according to claim 1.

8. The audio rendering system according to claim 7, wherein the wireless communication units are Bluetooth communication units.

9. The audio rendering system according to claim 1, wherein maintaining the audio rendering system and the first audio source connected by the wireless link comprises maintaining the wireless link in a connected mode involving recurrent signaling to preserve the link, while receiving the second audio stream.

10. A method for switching between a first audio source and a second audio source by an audio rendering system comprising a primary wireless speaker and at least one secondary wireless speaker, wherein the method comprises:

> receiving a request to switch from receiving a first audio stream from the first audio source using a first audio topology to receiving a second audio stream from the second audio source using a second audio topology, wherein:
>> said first audio topology corresponds to a first set of wireless links established between the primary wireless speaker, the secondary wireless speaker, and the first audio source,
>> said second audio topology corresponds to a second set of wireless links between the primary wireless speaker, the secondary wireless speaker and the second audio source, and
>> the second audio topology being different from the first audio topology;
> establishing the second set of wireless links of the second audio topology;
> starting to receive the second audio stream;
> maintaining the audio rendering system and the first audio source connected by a wireless link of the first set of wireless links, while receiving the second audio stream;
> receiving a request to switch back to receiving the first audio stream from the first audio source, wherein, after having received a switch back request, the first audio topology is retrieved from data stored in a memory of the audio rendering system or received from the first audio source via the wireless link maintained between said audio rendering system and said first audio source;
> if not all wireless links of the first set of wireless links have been maintained: establishing all the wireless links of the first set of wireless links of the first audio topology;
> starting to receive the first audio stream; and
> maintaining the audio rendering system and the second audio source connected by a wireless link of the second set of wireless links, while receiving the first audio stream.

11. A method for switching between a first audio source and a second audio source by an audio rendering system comprising a primary wireless speaker and at least one secondary wireless speaker, wherein the method comprises:

> receiving a request to switch from receiving a first audio stream from the first audio source using a first audio topology to receiving a second audio stream from the second audio source using a second audio topology, wherein:
>> said first audio topology corresponds to a first set of wireless links established between the primary wireless speaker, the secondary wireless speaker, and the first audio source,
>> said second audio topology corresponds to a second set of wireless links between the primary wireless speaker, the secondary wireless speaker and the second audio source, and
>> the second audio topology being different from the first audio topology;
> establishing the second set of wireless links of the second audio topology;
> starting to receive the second audio stream; and
> maintaining the audio rendering system and the first audio source connected by a wireless link of the first set of wireless links, while receiving the second audio stream, wherein:
>> when the first audio topology is a forwarding audio topology and the second audio topology is a dual stream audio topology, and the first set of wireless links consists in a wireless link between the secondary wireless speaker and the primary wireless speaker and a wireless link between the first audio source and the primary wireless speaker:
>> terminating the wireless link between the secondary wireless speaker and the primary wireless speaker; and
>> changing a role parameter of the primary wireless speaker from master to slave.

12. A non-transitory computer-readable storage medium that stores a computer program product comprising instructions which, when executed by an audio rendering system comprising a primary wireless speaker and at least one secondary wireless speaker, each of the primary and secondary wireless speakers comprising a processing circuit, a wireless communication unit and an audio rendering unit, configure said audio rendering system to carry out a method according to claim 1.

13. The audio rendering system according to claim 7, wherein said audio rendering system corresponds to wireless earphones.

* * * * *